Aug. 17, 1926.

L. J. BLACK 1,596,144

WATER SWIVEL FOR ROTARY DRILLING

Filed June 9, 1923

Inventor

L. J. Black

By Frederick S. Hill

Attorney

Patented Aug. 17, 1926.

1,596,144

UNITED STATES PATENT OFFICE.

LEE J. BLACK, OF BEAUMONT, TEXAS.

WATER SWIVEL FOR ROTARY DRILLING.

Application filed June 9, 1923. Serial No. 644,424.

This invention relates to rotary hydraulic drilling mechanisms, and particularly to the water swivels thereof, the invention being an improvement on the water swivel construction illustrated in my Patent No. 1,372,266, granted March 22, 1921.

The general object of the invention is to provide a packing around an extension of the main stem of the swivel and to provide a packing gland, which gland bears upon this packing, this packing gland being so constructed and mounted that the pressure of water in the head of the swivel will force the packing gland against the packing and cause the gland to be automatically pushed down on the packing and to automatically take up wear in the packing until such a time as the packing is entirely worn out and has to be changed.

A further object is to so form this gland and the head or housing within which the gland is disposed that a circulation of liquid is secured beneath the gland and over the top thereof so as to keep in motion any sand or other solid substance that might settle around the gland and in any way tend to prevent it from following down on the packing.

Another object is to provide means whereby the packing gland may be initially forced down on the packing until it is impossible for fluid pressure to get beneath the packing gland and the packing and force the gland upward.

Other objects will appear in the course of the following description.

My invention is illustrated in the accompanying drawings, wherein:—

Figure 1:
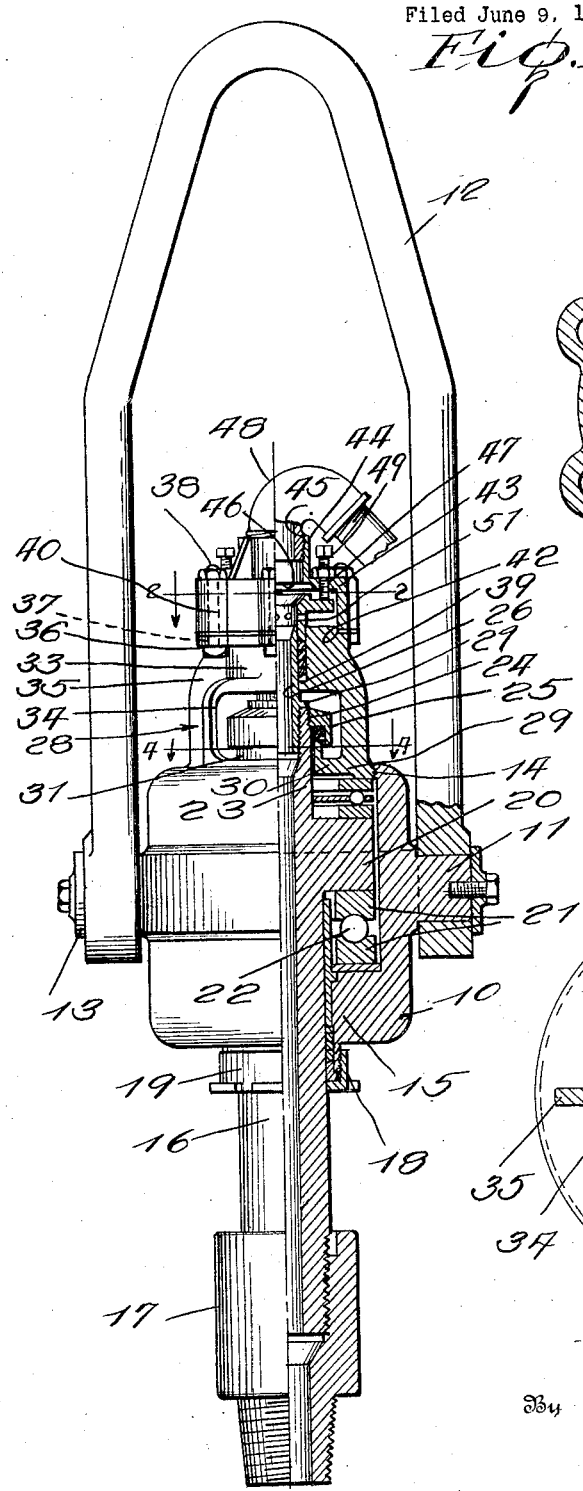
Figure 1 is a side elevation partly in section of my improved water swivel.

Referring to these drawings, 10 designates a trunnion block of substantially ordinary construction, this trunnion block carrying the trunnions 11 projecting through eyes in the lower ends of the swivel bail 12. This swivel bail is held upon the trunnions by means of the trunnion block washers 13 and the usual cap screws. The trunnion block is open at its upper end and is interiorly screw-threaded, as at 14. The lower end of the trunnion block is extended inwardly, as at 15, and formed to provide the usual aperture for the stem 16, this stem being connected to a drill stem coupling 17, as is usual. The lower end of the portion 15 of the trunnion block is extended downward and screw-threaded, as at 18, for engagement with the packing and thrust gland 19. The stem 16 extends upward into the interior of the trunnion block and is provided within the trunnion block with an outwardly projecting annular enlargement 20. Below this enlargement 20 there is disposed a complete anti-friction bearing of any usual or suitable construction comprising the upper and lower raceways 21 and the anti-friction balls 22. Above the enlargement 20 the stem is upwardly extended through the upper end of the trunnion block, as at 23, this upward extension being interiorly screw-threaded. This upward extension at its upper end has exterior threads 24 for engagement by a packing gland 25. Screwed into the upper end of the main stem 16 is an extension piece 26 having a shoulder 27 resting upon the upper end of the main stem.

Disposed within the opening of the trunnion block is a head casting, designated generally 28. This head casting is flanged at its lower end, as at 29, and this flanged portion is exteriorly screw-threaded to engage the screw-threads 14. The head casting has a base portion 30 formed with a central aperture and an upstanding wall 31 having a lining 32. The upper end 33 of the head 28 is annular in form and this annular portion 33 is connected to the base portion by a plurality of downwardly extending legs 34 reinforced by ribs 35, these ribs extending from the base portion upward to and connecting with an annular flange 36. This annular flange 36 is formed at intervals with apertures 37 for the passage of bolts 38. The annular portion 33 or neck has at its lower end an inwardly projecting annular flange 39 within which the stem extension 26 fits snugly. Thus, as shown in Figure 1, the interior diameter of the central opening in the portion 33 is greater than the exterior diameter of the stem extension 26 so as to leave a packing space between the stem extension 26 and the interior face of the portion 33.

Adapted to rest upon the flange 36 is a top cap 40. This cap has an annular body portion formed at intervals with bolt apertures 41 through which the bolts 38 pass. The lower end of this cap is open and is designed to fit in an annular seat 42 formed in the flange 36. The upper end of the cap extends inward, as at 43, and then extends upward, as at 44, the interior face of the upper end of this portion 44 being interiorly screw-threaded, as at 45. The under face of the portion 43 immediately surrounding the upward extension 44 is annually recessed, as at 46. The horizontal top wall of this cap 40 is formed at a plurality of points with interiorly screw-threaded apertures 47. A gooseneck 48 of ordinary form is adapted to have screw-threaded engagement with the screw-threads 45 in the usual manner. Screws 49 are adapted to be disposed within the screw-threaded aperture 47.

Figure 3:
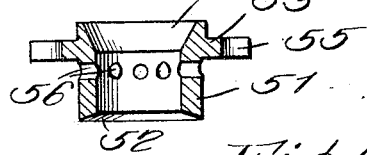
Figure 3 is a vertical sectional view through the packing gland.
Figure 4:
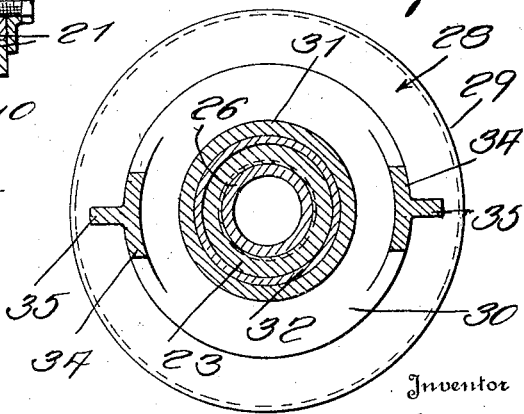
Figure 4 is a section on the line 4—4 of Figure 1.

Disposed in the packing space between the stem extension 26 and the inner face of the spaced portion 33 and resting upon the annular flange 39 are a plurality of packing rings 50, and adapted to bear against the upper surface of the topmost packing ring is a packing gland 51. This, as illustrated in Figure 3, is formed with a tubular body portion adapted to fit in the packing recess between the extension 26 and the wall 33 and downwardly and outwardly beveled at its lower end at 52 to fit against the upper face of the topmost packing ring 50. The upper end of this packing gland is flanged, as at 53, this flange being located slightly below the upper extremity of the gland. A central passage is thus left through the packing gland and the wall of this passage at the upper end of the gland is outwardly and upwardly beveled or flared at 54. The screws 49 bear against the upper face of this flange. By this means the packing gland may be initially forced downward against the packing rings 50. The flange 53 is cut away at a plurality of points, as at 55, these recesses engaging guide lugs 55ª on the cap to prevent the gland from turning with the stem, and just below the flange 53 the body of the packing gland is formed with the radial apertures 56.

Figure 2:
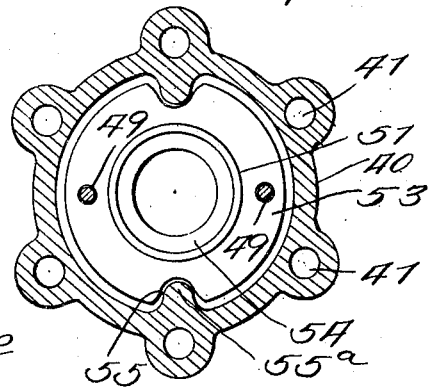
Figure 2 is an enlarged section on the line 2—2 of Figure 1.

It will be noted from Figure 1 that the screws 49 hold the flange 53 spaced from the horizontal portion 43 of the cap 40. It will likewise be noted from Figure 2 that the flange 53 has an exterior diameter less than the interior diameter of the cap 40 and that the upwardly projecting portion of the gland has an exterior diameter less than the interior diameter of the flared portion 46 of the cap so that this gland is spaced at all points from the cap.

Disposed between the shoulder or annular flange 20 of the stem and the base of the head casting are anti-friction members of ordinary form including raceways 57, the anti-friction balls 58, and the cage or carrier 59 therefor. Any suitable anti-friction devices may be used in place of the specific devices illustrated, however. It will be noted that the stem extension 26 constitutes part of the main stem and is rotatable therewith. In this construction, therefore, the stem is simply formed in two sections, one of which screws into the other section.

In the operation of this swivel, water is forced in through the gooseneck 48 and down through the stem 16, as is usual. The water is under pressure and as the water enters the chamber formed by the cap 40 the kinetic energy of the water will exert pressure against the gland 51, since the surface 54 is exposed to the impact of the water. It is to be noted from Figure 1 that the upper end of the gland including the beveled face 54, the upper edge of the wall defining this beveled face and the upper face of the flange 53, is greater in area than the lower face of the flange 53 by about 18% so that there is thus more pressure upon the upper face of the gland than there is against the lower face thereof and thus the pressure will act to urge the gland downward against the packing 50 and thus as the packing wears this gland will automatically be forced downward to take up and compensate for any wear until the time when the packing is entirely worn out. The gland 51 has the openings 53 drilled through the body of the gland just below the flange for the purpose of permitting the circulation of the fluid around and beneath the gland and around over the top of the gland. This circulation of the fluid over the top and beneath the bottom of the gland keeps any sand or other solid substance that may have accumulated within the cap in motion and prevents this sand or other foreign matter from settling beneath the gland and prevents it from following down on the packing. The screws 49 hold the gland down on the packing until the packing is tight and it is impossible for any fluid to pass around between the inner face of the gland and the gland recess and thus get beneath the lower end of the gland. It will be seen that the recess at the top of the gland will cause a pressure to be exerted thereon of about 18% of the total pressure carried in the head. Therefore, if 400 pounds of pressure per square inch was being carried within the head or within the cap 40, there would be approximately 70 pounds of pressure per square inch applied to the packing.

I claim:—

1. In a swivel, a hollow trunnion body, a swiveled stem extending through said trunnion body, means for supporting the swiveled stem within said trunnion body, a chamber within which the upper end of the swiveled stem terminates, there being an annular recess around the same through which the swiveled stem passes, packing rings disposed within said recess, a gland for said stem positioned in the chamber and adapted to be forced into the recess and against the packing rings by the pressure of water within the chamber, and means extending into the chamber from the exterior thereof whereby the gland may be initially forced toward said packing rings.

2. In a swivel, a hollow trunnion body, a swiveled stem extending through said trunnion body, means for supporting the swiveled stem within said trunnion body, a chamber within which the upper end of the swiveled stem terminates, means for adjusting the swiveled stem entering one end of the chamber, a gland for said stem positioned in said chamber and adapted to be forced into position by the pressure of water within the chamber, the gland being provided with an outwardly projecting portion disposed to the pressure of water within the chambered member and the gland having a plurality of perforations extending through the gland from the outside to the inside thereof and disposed below the outwardly projecting portion to thereby prevent the collection of foreign matter between the projecting portion of the gland and the part engaged by the gland.

3. A swivel for use in rotary well drilling including a trunnion body, a stem swiveled therein, the stem extending upward beyond the body, a head mounted on the body and having a neck concentric to the stem, the neck being spaced from the stem, packing disposed between the neck and the stem, a cap mounted on the head and formed to provide a fluid chamber concentric to the neck and having an inlet opening, a gland in the chamber having a portion surrounding said neck and bearing against the packing and having the upper end formed with an annular flange, the upper face of the gland being greater in area than the lower face of the gland, the body of the gland below the flange being formed with a plurality of radially extending perforations leading from the interior face of the gland to the exterior thereof, the flange of said gland being less in diameter than the interior diameter of the cap whereby to permit a circulation of liquid above and beneath the flange of the gland and through the cap.

4. A swivel for rotary well drilling including a trunnion body, a stem swiveled therein, the stem extending upward beyond the body, a head mounted upon the body and having a neck extending concentric to the stem, the neck being spaced from the stem, packing disposed in the space between the neck and stem, a cap mounted on the head and formed to provide a fluid chamber concentric to the neck and having an inlet opening, a gland in the chamber, the lower end of the gland extending into the space between the neck and the stem, the upper end of the gland being outwardly flanged and exposed to the pressure of water within the chamber, the upper face of the gland having an area greater than the area of the lower face of the gland, and means extending through the cap whereby the gland may be initially forced downward against the packing.

5. A swivel for rotary well drilling including a trunnion body, a stem swiveled therein, the stem extending upward beyond the body, a head mounted upon the body and having a neck extending concentric to the stem, the neck being spaced from the stem, packing disposed in the space between the neck and stem, a cap mounted on the head and formed to provide a fluid chamber concentric to the neck and having an inlet opening, a gland in the chamber, the lower end of the gland extending into the space between the neck and the stem, the upper end of the gland being outwardly flanged, the upper face of the gland having an area greater than the area of the lower face of the gland, and a plurality of screws extending through the cap and bearing against the flange of the gland whereby the gland may be initially forced downward against the packing.

6. In a structure of the character described, a body having a central bore, a stem disposed in said bore for rotation therein, the bore at one end having a diameter equal to the exterior diameter of the stem but beyond this end being greater in diameter than the stem, packing disposed in said space, an annular gland having a portion disposed in said space and bearing against the packing, the opposite end of the gland being flanged, a cap attached to the body and forming a chamber enclosing said flanged portion of the gland, this chamber having an opening for the admission of liquid, and means extending through the walls of the chamber and engaging the gland whereby the gland may be initially forced downward into engagement with the packing, the surface of the gland remote from the packing having an area larger than the surface of the gland adjacent the packing and the body of the gland having perforations permitting the circulation of liquid around the gland and in the interior of said cap.

7. A structure of the character described including a body formed to provide an annular packing space, a member extending into said body and forming the inner wall of said packing space, the body being formed to provide a chamber, into one end of which the packing space opens, the opposite end of this chamber having an inlet opening, packing disposed in said packing space, an annular gland having a portion disposed in said packing space and bearing against the packing, that portion of the gland disposed within the chamber having an annular flange, the face of the body and flange of the gland remote from the packing space having an area greater than the face of the flange confronting the packing space, and screws passing through one wall of the chamber and bearing against said flange whereby to urge the gland against the packing.

8. A structure of the character described including a body formed with a central bore, the bore at one end having an inwardly projecting flange and the body at its other end having an outwardly projecting flange, a hollow cap seating upon the flange of the body and having a central inlet aperture, bolts detachably holding the cap to the body, a tubular member extending upward through the bore of the body and against which the flange bears, packing disposed around said tubular stem and in said bore, an annular gland resting upon said packing and extending up into the interior of the cap, said gland having an outwardly extending annular flange cut away at a plurality of points, the gland below said flange having a series of radially extending apertures, the flange having a diameter less than the diameter of the interior of the cap, and adjusting screws passing through the cap and bearing against said flange whereby the gland may be forced against the packing, the cap having guides with which said cut away portions of the flange engage.

9. In a mechanism of the character described, a member having an annular recess, packing disposed therein, a packing gland disposed within said recess and bearing against the packing, the member being formed to provide a chamber extending over the packing gland and the packing gland having an outwardly projecting flange entirely enclosed within said chamber, means for admitting fluid pressure to the chamber whereby to force the gland against the packing, the gland being formed between said flange and the wall of the chamber toward which the gland is moved with a plurality of openings whereby to secure circulation of water between the flange and the adjacent wall of the chamber.

In testimony whereof I affix my signature.

LEE J. BLACK.